Figure 1:
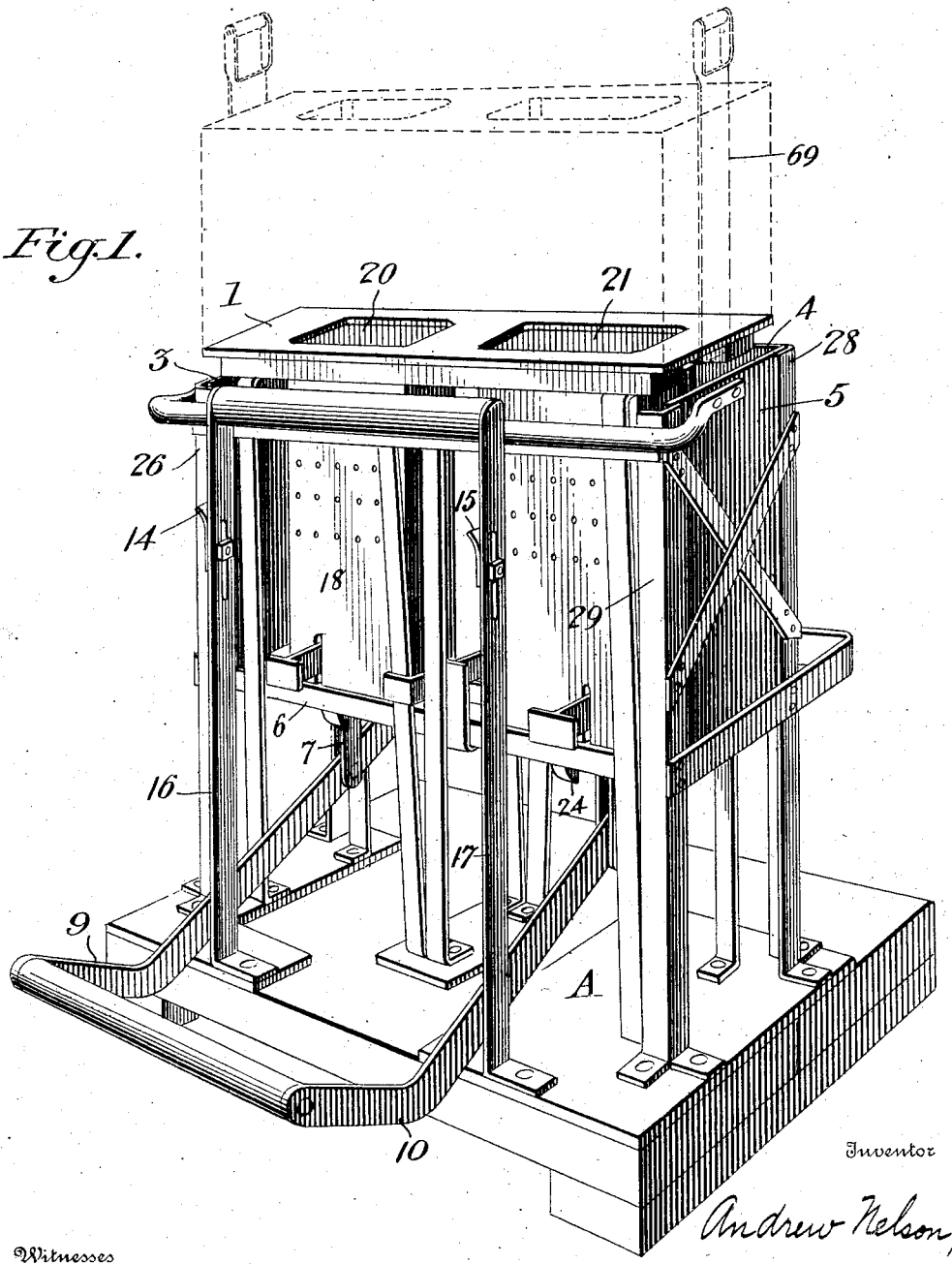

No. 874,230. PATENTED DEC. 17, 1907.
A. NELSON.
MACHINE FOR MOLDING BUILDING BLOCKS.
APPLICATION FILED MAY 22, 1907.

4 SHEETS—SHEET 1.

Witnesses
D. W. Edelin.
[signature]

Inventor
Andrew Nelson,
By Pennie & Goldsborough,
Attorneys

No. 874,230. PATENTED DEC. 17, 1907.
A. NELSON.
MACHINE FOR MOLDING BUILDING BLOCKS.
APPLICATION FILED MAY 22, 1907.
4 SHEETS—SHEET 2.
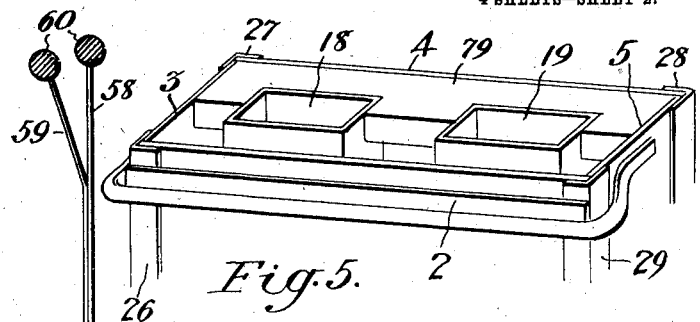
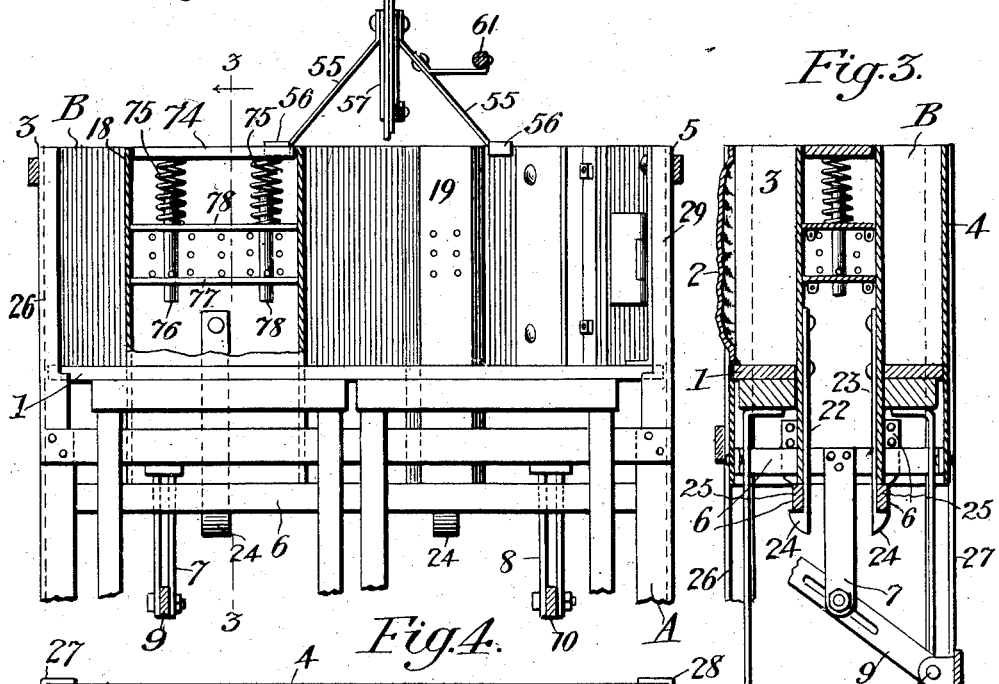
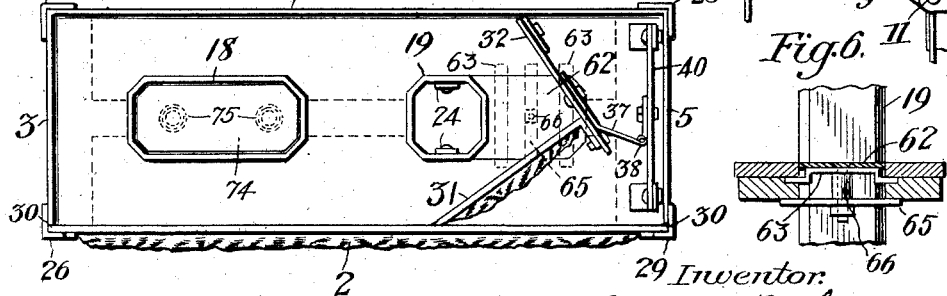
Inventor:
Andrew Nelson,
By Pennie + Goldsborough.
Attorneys.

No. 874,230. PATENTED DEC. 17, 1907.
A. NELSON.
MACHINE FOR MOLDING BUILDING BLOCKS.
APPLICATION FILED MAY 22, 1907.

4 SHEETS—SHEET 3.

Inventor
Andrew Nelson,
By Pennie & Goldsborough
Attorneys

Witnesses

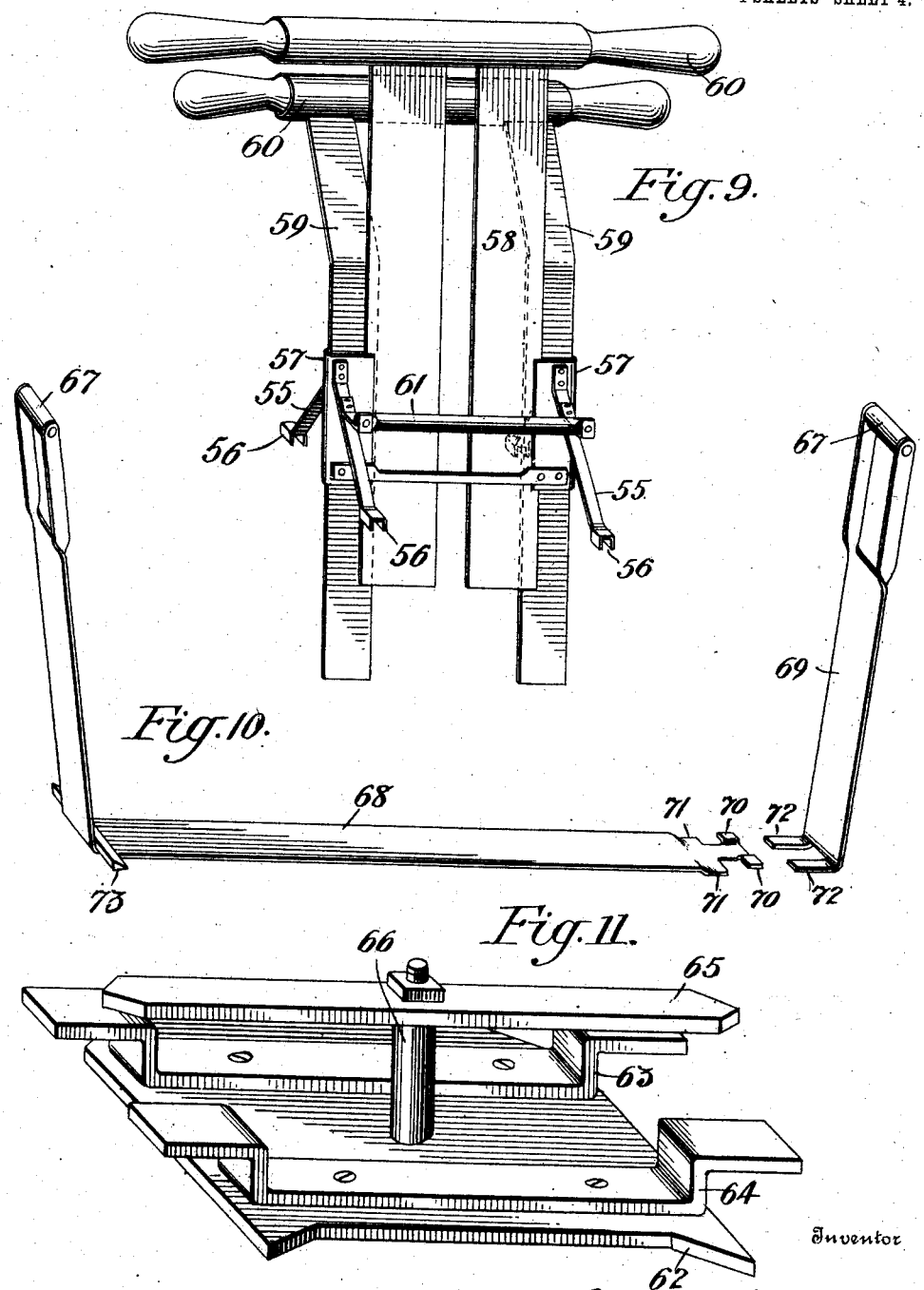

UNITED STATES PATENT OFFICE.

ANDREW NELSON, OF ROCK ISLAND, ILLINOIS.

MACHINE FOR MOLDING BUILDING-BLOCKS.

No. 874,230.    Specification of Letters Patent.    Patented Dec. 17, 1907.

Application filed May 22, 1907. Serial No. 375,010.

*To all whom it may concern:*

Be it known that I, ANDREW NELSON, a citizen of the United States, residing at Rock Island, county of Rock Island, State of Illinois, have invented certain new and useful Improvements in Machines for Molding Building-Blocks; and I do hereby declare the following to be a full, clear, and exact description of the invention, such as will enable others skilled in the art to which it appertains to make and use the same.

The invention relates to machines of that type designed for the formation of building blocks or tiles constructed of concrete, cement or equivalent plastic composition, and has in view the construction of a machine which will enable the making of building blocks, of the character described, to be carried on with greater ease and rapidity than heretofore.

Another object of the invention is to provide an apparatus which permits of ready adjustment and interchange of the mold-box parts, whereby the same may be adapted to shape plain, angular, and various other types of blocks or tiles, such as employed for building purposes.

Still another object of the invention is to provide means of the character described, whereby there will be small liability of breakage, crumbling or waste in manufacturing and removing the blocks.

It is a further object of the invention to provide, in connection with my improved molding apparatus, a cutter whereby the blocks, after being molded, and before being taken out of the machine, may be cut so as to be used in parts or pieces of any desired size.

A further object of the invention is to provide improved hollow mold cores which will allow for the easy tamping of the material in the mold, said cores being easily attached to and detached from the molding machine.

To facilitate the removal of the freshly formed building blocks or tiles from the machine after the movable parts of the mold have been withdrawn or released from the block, I have also provided, in connection with my molding apparatus, an improved lifting strap which is adapted to be inserted beneath the bottom plate of the mold for lifting and carrying it and the freshly formed block or blocks resting thereon out of the machine, so that the block may be handled without danger of marring or breaking the same.

With these and other objects in view, which will more readily appear as the nature of the invention is better understood, the same consists in the novel construction, combination, and arrangement of parts hereinafter more fully described, illustrated and claimed.

Figure 7:
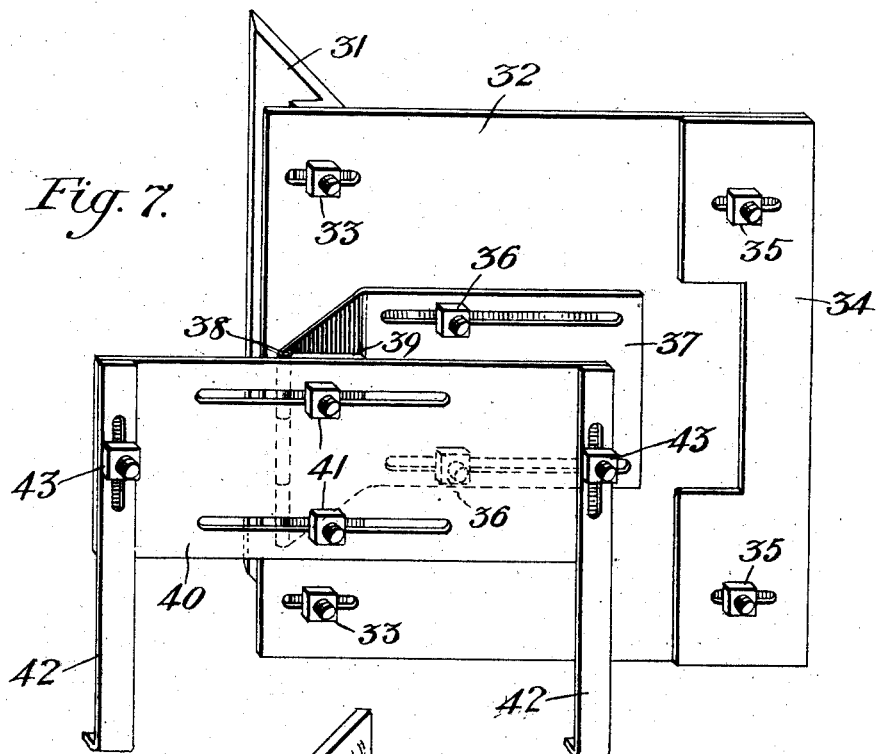
Figure 8:
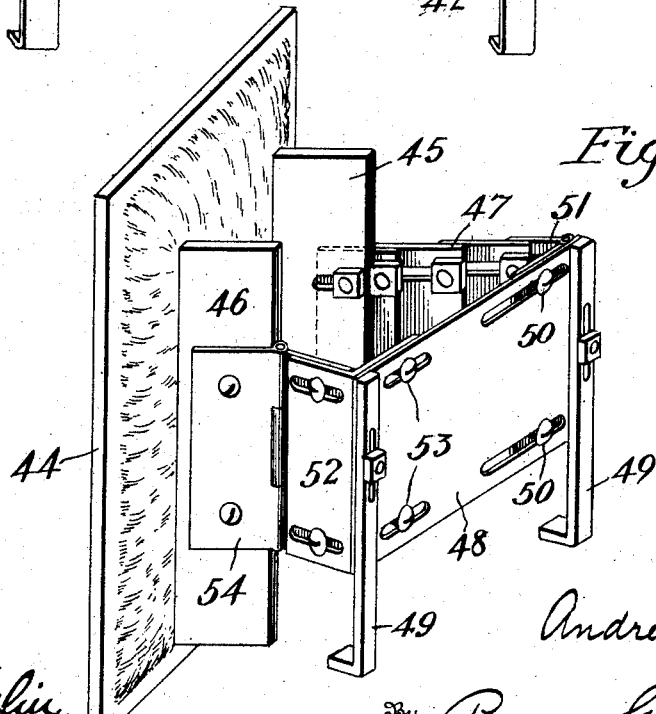

The invention can be best explained in connection with the accompanying drawings, in which Figure 1 is a perspective view of the machine embodying the invention; Fig. 2 is a side elevation, partly in section, of the upper portion of the molding machine, illustrating the cutter in position on the machine for cutting the block; Fig. 3 is a vertical section on the line 3—3 of Fig. 2, looking in the direction of the arrow, the apparatus being shown in position for molding a block; Fig. 4 is a top plan view of the mold-box showing the adjustable apparatus for molding blocks with ends of various angles; Fig. 5 is a perspective view of a portion of the mold-box and cores illustrating the device for forming blocks with cut-out portions along one of its corners; Fig. 6 is a view in section illustrating the means for attaching the plate for closing the core opening in the bottom plate of the mold; Fig. 7 is an enlarged view in perspective of the apparatus for molding blocks with ends of various angles; Fig. 8 is a view in perspective of a somewhat modified form of apparatus for forming blocks with ends of any desired angle; Fig. 9 is a perspective view of the cutting apparatus; Fig. 10 is a perspective view of the lifting device, and Fig. 11 is a view in perspective of the plate for closing the core opening in the bottom plate of the mold.

Referring to the drawings, the apparatus comprises a frame A, upon which is supported the mold-box B.

The mold-box B comprises a bottom plate 1, which is supported in stationary position upon the frame A during the operation of molding, and vertical sides 2, 3, 4 and 5, which may be connected with a suitable frame work 6, pivotally secured by links 7 and 8 to the levers 9 and 10, pivoted to the frame A at 11 and 12, their outer ends being joined by a bar 13, which serves as a handle for raising and lowering the sides and cores of the mold, as will be hereinafter set forth. The levers may be held in raised position by means of spring catches 14 and 15, which are adjustably secured upon the uprights 16 and 17, fixed to the frame A of the machine.

Detachably secured to the frame work 6, which carries the sides of the mold, and adapted to move therewith, are the cores 18 and 19, which extend through holes 20 and 21 in the bottom plate 1 of the mold-box. The improved detachable means for securing the said cores in place on the frame work 6 consists of the spring catches 22 and 23, which are riveted to the cores on opposite sides thereof, and which are provided with the enlarged heads 24, having beveled faces which enables them to be inserted into the opening of the bottom plate of the mold, and also to pass beneath the longitudinal strips 25 of the frame work 6, for securely fastening the cores in position. These cores are made hollow, as shown, and are provided with a spring plate which serves as a cover plate for the top of said cores, and which will be more fully hereinafter described. The vertical corners of the mold formed by the sides fit closely within angular guides 26, 27, 28 and 29, so that the sides are properly directed in their vertical movement.

Where it is desired to produce a block having plain faces, the sides of the mold may be secured to the frame work 6, and all of them move vertically together. It may be, however, that it is desired to make one of the faces appear rough, like that of stone, or have other irregular configuration, in which case an irregular side plate would be provided, as shown most plainly in Figs. 3 and 4. It is obvious that such a plate could not be moved vertically without destroying the face of the block; and, therefore, in such a case the remainder of the sides of the mold are made movable independently of the irregular side, as well as of the bottom plate. This may be accomplished by making the bottom of the irregular plate somewhat wider than the plain ones, so that it will be caught upon the bottom plate of the mold as the remainder of the sides are moved downwardly. This irregular plate is held in proper relation to the other sides by having its ends fit in grooves, as 30, in those sides. While this prevents the irregular plate from moving laterally with relation to the others, independent vertical movement is permitted. It will be obvious that the construction above described with reference to one irregular plate can be extended to more than one to produce a plurality of irregular faces upon the block.

If it should be desired to mold blocks with beveled or angular corners, I have provided an angle partition, as clearly shown in Figs. 2, 4 and 7 of the drawings, said partition made up of two plates 31 and 32 arranged at an angle, one to the other, and adjustably secured to each other by the screw fastenings 33, for the purpose of enabling said angle partition to be used in different size mold-boxes. For providing a further adjustment in this regard, the plate 32 is provided with an extension plate 34 which is adjustably secured in place by means of the screw fastenings 35. Also adjustably attached to the partition plate 32 by means of the screw fastenings 36, is an angle plate 37, which is in turn hinged, as at 38, to the plate 39, adjustably secured to the abutment plate 40 by means of screw fastenings 41, said plate 40 being adapted, when in proper position, to lie against the inner face of one of the sides of the mold-box. The plate 40 is provided with the legs 42 which are adjustably secured thereto by means of the screw fastenings 43, and the same serve to steady the angle partition plates when in place for molding purposes. By the arrangement and the various adjustments of the plates 37, 39 and 40, the angle partition plates 31 and 32 may be set at any angle desired for the purpose of forming blocks of various styles and with the proper beveled or angular corners.

Should it not be desired to make a block with beveled corners, but to form the end of said block with an angle of any desired inclination, I use a somewhat modified form of partition plate, substantially as illustrated in Fig. 8 of the drawings. In this instance, there is a single partition plate 44, which has integrally formed therewith the projecting lugs or pieces 45 and 46, and to which the extensible plates, for adjusting the partition 44 to any desired angle, are attached. Similar to the means for forming the blocks with beveled corners, this device is provided with the abutment plate 48, having the supporting legs 49 adjustably secured thereto, and for a purpose as above described. To this plate 48 is adjustably secured, at one end thereof, by means of the screw fastenings 50, a hinged plate 51, to which the extensible plates 47 are attached, said extensible plates serving as one of the adjustable connecting means between the partition plate and the abutment plate 48. An angle plate 52 is also adjustably fastened to the other end of the plate 48 by means of the screw fastenings 53, and to this angle plate 52 is adjustably secured, in like manner, the hinged plate 54, which is in turn detachably secured to the lug 46 on the partition plate 44. By the arrangement of these various adjustable parts, the partition plate 44 can be positioned at any desired angle across the end of the mold-box, and a block of the desired angular end can be produced without difficulty. It is to be understood that the plate 48, in the present device, when in proper place for molding, will be arranged in a vertical position and adapted to lie against the inner face of one of the sides of the mold-box, as in the device for forming beveled corners on the blocks heretofore described. It is also to be noted that the partition plates 31, 32 and 44, instead of having plain faces, may be formed with a rough or irregular face for forming the ends of the blocks with faces of irregular configuration.

It often happens in the manufacture of these cement blocks, that, after the mold-box and its parts have been adjusted for the making of blocks of a desired size, it becomes necessary to make blocks of somewhat smaller size than that for which the machine has been set, and I have found that time can be saved by providing a cutting apparatus so applied to the molding machine that the blocks, after being molded, and before being taken out of the machine, may be cut to the desired size. Such cutting apparatus is clearly shown in Figs. 2 and 9 of the drawings, and is provided with brackets 55 which support and hold said cutting apparatus in position upon the molding machine. These brackets are provided with grooved feet 56 which engage the upper edges of the sides of the mold-box, and thus allow for a sliding movement of the cutting apparatus lengthwise of the mold-box, in order that it may be placed in the desired position for cutting the blocks. The brackets 55 are provided with grooved ways 57 which are vertically arranged, and within which the two sets of cutters 58 and 59 are adapted to slide. Each set of cutters is provided with a handle 60 for operating the same, and when it is desired to cut the block opposite a core, the cutters 59 are operated, said cutters being of such a width as to easily pass the core on either side thereof. Should it be desired to cut the block at a point where no cores intervene, it is to be noted that both sets of cutters 58 and 59 are operated simultaneously. In no instance, however, do the cutters cut entirely through to the center of the block, and this is done for the purpose of leaving a sufficient portion of said block uncut to hold the block together until it is desired to be used, when the block can be easily separated by the tap of a hammer or other instrument. A rod 61 is provided for the purpose of serving as a handle which may be held to steady the cutting apparatus when operating the cutters.

If it be desired to have the blocks made solid, the cores would be omitted and the holes in the bottom plate closed by means of suitable plates. It may also be desirable to use smaller cores in making the blocks, in which instance a closure plate 62, such as shown in Fig. 11 of the drawings, is used for closing the opening in the bottom plate 1 to one side of the core. This plate is adapted to lie flush with the upper face of the bottom plate 1, and is provided with strips 63 and 64 screwed or otherwise fastened to the bottom of said closure plate. Between these strips 63 and 64 and a clamping strip 65, which is pivoted to a depending stud 66 on the bottom of the plate 62, is clamped a portion of the stationary frame work of the machine, for the purpose of holding said closure plate in its proper position.

For the purpose of facilitating the removal of the molded block, without touching the same, the frame work of the machine is so constructed that rods or other lifting means may be applied beneath the bottom plate 1 of the mold, and the plate removed with the molded block. The preferred means for lifting said block from the machine is clearly shown in Fig. 10 of the drawings, and consists of a two part rod or strap provided with the handles 67, which rod or strap is adapted to be inserted beneath the bottom plate of the mold from the end of the same, so that the strap will lie lengthwise of the block and the block be lifted from the ends only, which will enable the blocks being placed close together when stored for drying. Connection between the two parts 68 and 69 of the lifting strap is made as clearly shown, the end of the part 68 being formed with bent up lugs 70, and the turn down portions 71, between which the projections 72 on the lower end of the part 69 of the lifting strap are inserted in making the connection. By this means the touching or handling of the molded block to effect its removal from the machine is rendered unnecessary and the consequent crumbling and breakage of the block is avoided. The strip 73 is riveted or otherwise secured to the strap, and serves to steady the block and prevent it from tilting to either side while being carried. It is to be noted that when the plate for closing the opening in the bottom plate 1 is used, the lifting means just described cannot be used, for the reason that said closure plate is securely fastened to a stationary part of the machine frame, and, owing to the fact that its upper face lies flush with the upper face of the bottom plate, there is no possible way of inserting said lifting strap beneath the bottom plate. In such an instance other well known lifting means may be provided. Should the closure plate, however, be so formed that it could be attached directly to the bottom plate 1, both plates could be lifted with the block in withdrawing said block from the mold.

As has been heretofore described, the cores 18 and 19 are provided with a spring plate 74 which serves as a cover plate for the said hollow cores, and is adapted to yield as the same is struck by the tamping tool during the filling and tamping of the material in the mold-box. This closure plate 74 is mounted on springs 75 which are held in place by vertical rods 76 secured to a plate 77 arranged within the hollow cores. It has been found that by providing a spring closure plate such as described, that the filling and tamping of the mold can be accomplished with much less work, and in less time, said spring plate allowing the material lodging on top of the same to give when the mold is being tamped, which enables the entire top of the mold-box to be tamped, instead of tamping around the cores, as heretofore. Holes or perforations 78 are formed in the cores 18 and 19, for the purpose of allowing the air contained in said molds to escape as the closure plate 74 is depressed during the operation of the tamping of the material in the mold.

In Fig. 5 of the drawing I have illustrated a strip 79 of a length substantially that of the mold-box, which strip may be made of wood or any other desirable material, and is provided for the purpose of forming blocks with cut out portions along their entire length. In making such blocks the material is filled into the mold to the height where it is desired to form said cut out portion, and then placing the strip 79 in the mold, whereupon more of the material may be placed in the mold-box until the same is filled with said material flush with the inserted piece 79. These strips may be made of any desired size, and should they be of such a size as to extend beyond the cores 18 and 19, the strips are cut out along one side thereof to fit neatly around said cores, as clearly shown in Fig. 5.

The operation of the machine is as follows: The handle 13 having been raised to its upper position and secured by the catches 14 and 15, the sides and cores of the mold will be raised and occupy positions, as shown in Figs. 2 and 3. The cement or other material of which the building block is to be constructed may then be filled into the mold and tamped. Having filled the mold and tamped the material therein, the levers 9 and 10 are released, and the frame 6, with its attached side plates and cores, is moved to its lower position, as shown in Fig. 1 of the drawings. As before stated, if all of the sides of the mold are plain, they may all move with the frame work 6 of its lower position. This leaves the formed block upon the bottom plate 1, and the hole may be removed by placing the lifting strap beneath the bottom plate, as heretofore described, and lifting it, and with it the block, from the machine, and the block may then be placed in any desired location for drying. Where irregular side plates are used, they do not, as above set forth, move downwardly with the other sides, but remain with the block and bottom plate and may be removed therewith. A block and bottom plate having been removed, a new bottom plate is placed in position upon the frame and the sides and core raised into molding position, as before described, irregular side plates, if used, being placed in position, as before described.

While the invention has been illustrated by a structure which is adapted to carry it into effect, it is to be understood that the structure is illustrative merely, and that the invention could be embodied in different structures, without departing from its spirit. It should not, therefore, be limited to the structure shown.

What I claim is:—

1. In a machine for molding blocks, the combination with a mold box, of a removable partition plate arranged in said mold box for shaping one of the sides of the block to be molded, an abutment plate also removably placed within the mold box and adapted to abut against one of the walls thereof, and a hinge connection between the partition plate and said abutment plate.

2. In a machine for molding blocks, the combination with a mold box, of a removable partition plate arranged in said mold box for shaping one of the sides of the block to be molded, an abutment plate also removably placed within the mold box and adapted to abut against one of the walls thereof, and an adjustable hinge connection between the partition plate and said abutment plate.

3. In a machine for molding blocks, the combination with a mold box, of a removable partition plate arranged in said mold box for shaping one of the sides of the block to be molded, an abutment plate also removably placed within the mold box and adapted to abut against one of the walls thereof, extensible supporting legs for the abutment plate, and a hinge connection between the partition plate and said abutment plate.

4. In a machine for molding blocks, the combination with a mold having removable sides, of a removable partition arranged in said mold, said partition comprising two plates adjustably connected together at an angle one to the other, an extension plate connected to the outer end of one of the partition-plates, and means connected with the partition for adjusting the same to various positions in the mold.

5. In a machine for molding blocks, the combination with a mold having removable sides and cores, of a bottom plate having openings therein through which the cores project when in position for molding, a plate for closing said openings and adapted to lie flush with the top face of the bottom plate, and means attached to the bottom of said closure plate for securing it in proper position, the same consisting of one or more strips 63 fastened to the bottom of the closure plate and a strip 65 pivoted to a depending stud 66 on said plate, between which strips 63 and 65 a portion of the machine frame is clamped.

6. In a machine for molding blocks, the combination with a mold box, of one or more hollow cores arranged in said mold box, a cover plate fitting within the cores, one or more supporting springs for the cover plate whereby said plate may yield during the tamping of the mold, and guide rods for said springs.

7. In a machine for molding blocks, the combination with a mold box, of one or more hollow cores arranged in said mold box and having perforated side walls, a cover plate fitting within the cores, one or more supporting springs for the cover plate whereby said plate may yield during the tamping of the mold, and guide rods for said springs.

8. In a machine for molding blocks, the combination with a mold box, and a cutter mounted on the mold box and adapted for sliding movement for the purpose of adjusting the cutter to position for cutting the block after being molded.

9. In a machine for molding blocks, the combination with a mold having removable sides, and a cutter having vertically sliding movement in brackets mounted on the mold, said brackets being adapted for sliding movement in a horizontal direction for the purpose of adjusting the cutter to position for cutting the block after being molded.

10. In a machine for molding blocks, the combination with a mold having removable sides, of one or more cores for said mold, a horizontally slidable bracket mounted on the mold, vertical guides in said bracket, and cutters arranged in said guides and adapted to be operated for cutting the block after it has been molded and before withdrawing the same from the mold.

11. In a machine for molding blocks, the combination with a mold having removable sides, of one or more cores for said mold, a horizontally slidable bracket mounted on the mold, vertical guides in said bracket, and two sets of cutters arranged in said guides for sliding movement, one set of cutters being adapted to cut the block at a point opposite the cores, and both sets of cutters being used when cutting the blocks at a point where no cores intervene.

12. In a machine for molding blocks, the combination with a mold having removable sides, of a bottom plate for the mold, a lifting strap adapted to be inserted beneath the bottom plate lengthwise of the same, and a strip secured to said lifting strap and adapted to lie against the bottom plate for preventing movement of the block to either side while being carried.

13. In a machine for molding blocks, the combination with a mold having removable sides, of a bottom plate for the mold, and a two-part lifting strap provided with handles for lifting said plate and the molded block from the machine, the end of one of said parts having bent-up lugs 70 and turned-down portions 71, between which the projections 72 on the lower end of the other part of the strap are inserted in making the connection between the two parts.

In testimony whereof I affix my signature, in presence of two witnesses.

ANDREW NELSON.

Witnesses:
   Jno. J. Ingram,
   Chas. L. Walker.